United States Patent
Mzyk et al.

(10) Patent No.: US 6,652,623 B2
(45) Date of Patent: Nov. 25, 2003

(54) METHOD AND KIT FOR WORKING UP A GOLD BATH

(75) Inventors: Waldemar Mzyk, Calw (DE); Susanne Ruebel, Auerbach (DE)

(73) Assignee: Wieland Dental + Technik GmbH & Co. KG, Pforzheim (DE)

(*) Notice: Subject to any disclaimer, the term of this patent is extended or adjusted under 35 U.S.C. 154(b) by 0 days.

(21) Appl. No.: 09/836,440

(22) Filed: Apr. 18, 2001

(65) Prior Publication Data

US 2001/0039854 A1 Nov. 15, 2001

(30) Foreign Application Priority Data

Apr. 20, 2000 (EP) .............................................. 00108614

(51) Int. Cl.⁷ .............................................. C22B 11/04
(52) U.S. Cl. .......................................... 75/736; 75/741
(58) Field of Search ........................ 75/736, 741, 714, 75/373

(56) References Cited

U.S. PATENT DOCUMENTS

| 3,957,603 A | * | 5/1976 | Rhodes ........................ 205/571 |
| 4,092,154 A | | 5/1978 | Dietz, Jr. et al. |
| 4,342,591 A | * | 8/1982 | Lesoille ........................ 423/27 |
| 4,416,786 A | | 11/1983 | Knorre et al. |
| 4,670,052 A | * | 6/1987 | Stanley et al. ................. 423/22 |
| 5,028,260 A | * | 7/1991 | Harris et al. ................... 75/736 |
| 5,607,820 A | * | 3/1997 | Nakamura ................... 430/393 |
| 5,985,904 A | * | 11/1999 | Jeschke et al. ............. 514/364 |

OTHER PUBLICATIONS

Okubo, T., et al., "New Sumitomo Process for Gold Recovery from Copper Anode Slime." Proceedings of the 1984 AIME Annual Meeting, 517–536, XP–000952470, 1984. No Month.

* cited by examiner

*Primary Examiner*—Scott Kastler
(74) *Attorney, Agent, or Firm*—Nath & Associates PLLC; Gary M. Nath; Jerald L. Meyer

(57) ABSTRACT

In a method for working up a gold bath or a gold alloy bath, which contains gold in the form of a gold sulphite complex, working up takes place through at least one oxidant, which oxidizes the sulphite contained in the complex and reduces the gold contained in the complex to its metallic form. In the method in particular hydrogen peroxide and potassium-peroxo-monosulphate are used as oxidants. The oxidants are provided in a kit.

15 Claims, No Drawings

METHOD AND KIT FOR WORKING UP A GOLD BATH

BACKGROUND OF THE INVENTION

1. Field of the Invention

The invention mainly relates to a method and to a kit for working up a gold bath or a gold alloy bath containing gold in the form of a gold sulphite complex.

2. Description of the Prior Art

For a number of purposes gold or gold alloys are separated from in particular aqueous solutions, which contain the gold and optionally further alloy metals, usually in the form of complexes (so-called baths) and this usually takes place galvanically, i.e. using current. In particular due to its low toxicity compared with other gold baths, e.g. gold cyanide baths, particularly in the field of dental galvanic technology gold or gold alloy baths have become widely used and contain the gold in the form of a gold sulphite complex.

It is desirable, e.g. in dental technology, to be able to work up the residual gold content remaining after separation in the bath and to reuse the gold obtained.

In this connection it has long been known to galvanically work up gold sulphite baths. However, for this it is necessary to have a galvanizing apparatus comprising electronics, heating system, galvanizing vessel, electrode system, stirrer, etc., as well as a process control suitable for residual gold separation. The gold still contained in the complex is separated at the cathode. It is possible to use the most varied cathode materials, such as e.g. a metal and in particular stainless steel rod, a metallized and in particular nickel-plated plastic sponge electrode, etc. The separated gold is usually very firmly connected to the electrode (metal rod) and must be removed therefrom mechanically, e.g. by scratching off or only following separation is it available in fine gold form (plastic sponge electrode). Particularly in the case of highly concentrated gold sulphite baths gold separation is very complicated or time-consuming and may even be completely impossible as a result of the apparatus. For example, it is then often difficult and costly to introduce and appropriately arrange the electrodes in the bath. Thus, frequently galvanic gold separation is not a suitable processing process. Another disadvantage of galvanic residual gold separation is that any alloying elements contained in the bath are also separated.

The problem of the invention is to permit a current-free working up of gold baths or gold alloy baths. It is in particular to be achieved that the reprocessing is easily performed, selective and quantitative. It must lead to pure gold, because no alloying metals contained are to be precipitated. The process must not represent a health hazard for the user and as a result of the ease of disposal of the reaction products must be ecologically unobjectionable and in particular inexpensive.

SUMMARY OF THE INVENTION

This problem is solved by a method having the features of claim 1 and a kit having the features of claim 14, together with the use of an oxidant according to the features of claim 18. Preferred developments are described in the dependent claims 2 to 13, 15 to 17 and 19. By reference the wording of all the claims is made into part of the content of the present description.

The aforementioned method is inventively characterized in that at least one oxidant is added, which oxidizes the sulphite contained in the complex and reduces the gold contained in the complex to its metallic form. Thus, the oxidant added firstly acts as an oxidizing agent for the sulphite and secondly as a reducing agent for the gold contained in the complex with a positive oxidation number. The sulphite is preferably oxidized to sulphate and the gold contained in the complex, preferably gold-(I), is reduced to its metallic form.

Within the sense of the present invention gold sulphite baths are understood to mean all preferably aqueous gold or gold alloy baths based on sulphite with or without additives or impurities.

As a result of the sulphite oxidation according to the invention the water-soluble gold sulphite complex is destroyed and the gold is essentially precipitated in pure form as a metallic gold precipitate. However, in the case of reductive processes in which a reducing agent is added for reducing the sulphite present in the complex and consequently the gold sulphite complex is destroyed, it is firstly possible for toxic, malodorous hydrogen sulphide (H2S) to form and secondly any alloying metals contained in the bath such as manganese can also be precipitated and contaminate the gold precipitate. The gold precipitate obtained can also be contaminated with gold sulphide. this is not the case in the method according to the invention, i.e. there are no unpleasant smells and the precipitated gold is in pure form.

It is possible with the method according to the invention to work up gold baths having an alkaline, neutral or acid pH-value. However, preferably working up takes place in an acid medium, particularly a weak acid medium (pH under 7 to 5). Preferred gold sulphite baths which can be used frequently have a slightly alkaline pH-value. Optionally it is possible to adjust the pH-value weakly acid by adding corresponding substances and optionally by the choice of the oxidant.

Fundamentally the method according to the invention makes it possible to oxidatively work up all known galvanic gold or gold alloy baths based on sulphite and having a gold content of >0 to 80 g/l, particularly 2 to 40 g/l, i.e. also highly concentrated gold sulphite baths.

The oxidant can be any compound able to oxidize the sulphite contained in the complex and also reduce the gold contained in the complex. Thus, the oxidant is classified in the electrochemical series between sulphite and gold. Thus, the normal potential of the oxidant must be more positive than that of sulphite and more negative than that of gold. The preferred oxidant is hydrogen peroxide ($H_2O_2$), which can be alone or combined with other oxidants. Hydrogen peroxide is miscible in any ratio with an aqueous gold sulphite bath. It can be used in any commercial concentration. In particular use is made of a 3 to 15 wt. %, preferably 5 to 10 wt. % aqueous hydrogen peroxide solution. Hydrogen peroxide addition offers the advantage that hydrogen peroxide is an oxidant containing no additional constituents, such as e.g. metallic and/or miscellaneous constituents, which lead to gold impurities and/or which are ecologically objectionable. Thus, no further metal constituents are precipitated during its decomposition reaction with the gold sulphite complex.

It is also possible to use a compound as the oxidant which, during the reaction, "liberates" hydrogen peroxide. This compound can be added alone or combined with other oxidants, preferably hydrogen peroxide itself. Corresponding compounds which can be added are so-called per or peroxo compounds.

It is e.g. possible to use per(oxo)borates, such as sodium perborate or calcium perborate or per(oxo)carbonates, such as sodium per(oxo)carbonate. In the method according to the invention use is more particularly made of e.g. peroxo disulphate, peroxo urea (urea-$H_2O_2$) or in particular potassium-peroxo-monosulphate (KPMS). Through the addition of potassium-peroxo-monosulphate it is possible to detect the end of the reaction, because this can easily be established in the gold bath, e.g. with potassium iodide starch paper. It is consequently possible to detect in the gold bath any undecomposed potassium-peroxo-monosulphate in excess, in order to establish whether the gold contained in the complex has been completely precipitated. It is consequently possible to work in substance-economizing manner. The use of KPMS also has the advantage that of its own accord a KPMS excess can be completely reduced after a short period of time, e.g. 1 to 2 hours at a pH of 6.

According to the invention the oxidants can be added either all at once or portionwise, i.e. in partial quantities, to the gold bath.

In the method according to the invention preferably several and in particular two oxidants are added. It is possible to add the oxidants together, i.e. in a single-stage process, but preference is given to the successive addition of the individual oxidants, more particularly with a slight time lag. For example, the method is performed with at least two oxidants in at least two stages and preferably initially in a first stage at least one first oxidant is added and subsequently in a second stage at least one second oxidant is added.

When adding oxidants the reaction time of the first oxidant with the gold bath can be awaited and after optionally complete decomposition of the first oxidant the second oxidant is added.

In the method according to the invention preferably the first oxidant added is hydrogen peroxide and the second oxidant added is a peroxo compound, particularly potassium-peroxo-monosulphate. Hydrogen peroxide is a weaker oxidant than potassium-peroxo-monosulphate. It is admittedly possible to precipitate all the gold in the bath with hydrogen peroxide, but it is preferably used for starting up the reaction in the gold bath. The hydrogen peroxide quantity used can be varied in such a way that it only acts as a starter or initiator up to the quantity needed for reducing most of the complex. Hydrogen peroxide has no additional constituents, e.g. metallic and/or miscellaneous constituents, so that during its decomposition e.g. no metal is precipitated which could possibly contaminate the gold precipitate. In principle it is also possible to perform the working up of the gold bath with potassium-peroxo-monosulphate alone, but the latter has a limited effectiveness, so that it would be necessary to use a larger amount of this compound in order to completely precipitate the gold contained in the complex. Then the precipitated gold is also mixed with salts, which can have a disadvantageous effect on the subsequent treatment of the precipitated gold. They can only be eliminated by frequently washing the precipitate with water. Therefore potassium-peroxo-monosulphate is preferably added as the second oxidant. As opposed to hydrogen peroxide, potassium-peroxo-monosulphate can be easily detected in the gold bath and it is consequently possible to establish the end of the reaction, i.e. the precipitation of all the gold contained in the complex by identifying a KPMS excess.

It is possible with the method according to the invention, as desired, either partly or completely to precipitate the gold contained in the complex. Preferably the stoichiometrically necessary oxidant quantity is added in order to completely precipitate the residual gold contained in the complex. In the sense of the present invention completely precipitated means that following precipitation at least less than 0.5 g/l, particularly less than 0.5 mg/l are contained in the bath filtrate. The quantity can optionally also be dimensioned in such a way as to completely precipitate an unused gold bath. Preferably addition firstly takes place of hydrogen peroxide, preferably in commercial concentrations, particularly 3 to 15 wt. %, preferably 5 to 10 wt. % aqueous hydrogen peroxide solution, in order to precipitate 10 to 90%, preferably 60 to 90% and more particularly 70 to 80% of the residual gold. Subsequently preferably potassium-peroxo-monosulphate is added, in order to precipitate 10 to 90%, preferably 10 to 40% and in particular 20 to 30% of the residual gold.

In the method according to the invention the reaction in the bath is generally independent of the temperature. However, it is also possible to perform the reaction at elevated temperatures. In a multistage procedure at least one stage, particularly the first stage, is performed at elevated temperature. The temperature rise can be brought about in two ways. Firstly the bath can be heated to a higher than ambient temperature, so that optionally the reaction can take place more rapidly and secondly the bath temperature can be raised by adding exothermically reacting oxidants, e.g. hydrogen peroxide. If aqueous hydrogen peroxide solution is added as the first oxidant, as a function of the quantity added and the degree of dilution of the hydrogen peroxide, the bath can be heated to 30 to 90° C., particularly 40 to 50° C. For heating from the outside the preferred temperature range is 30 to 60° C.

The gold bath can undergo a prior and/or subsequent treatment. Thus, prior to the addition of the oxidant, the gold bath can in particular be diluted with water. After working up the gold bath the precipitated gold precipitate can be separated from the gold bath, e.g. decanted or filtered off. The precipitate can optionally be washed with water. The separated gold can then be thermally subsequently treated, e.g. annealed and therefore worked up to a nugget.

The invention also relates to the kit for the described working up of the gold bath. The kit has at least one oxidant for oxidizing the sulphite contained in the complex and for reducing the gold contained in the complex. Preferably the kit has two oxidants. These two oxidants are preferably hydrogen peroxide and a compound liberating hydrogen peroxide and in particular a peroxo compound. Preferably use is made of a 3 to 15 wt. %, particularly 5 to 10 wt. % hydrogen peroxide solution and potassium-peroxo-monosulphate. The kit can be a portion pack, which preferably contains two containers, particularly two small bottles of said oxidants. The kit according to the invention is characterized in that as a function of the gold bath to be worked up, it is possible to use very simple containers, e.g. measuring cups or the like, which ensure the easiest possible, reliable handling of the method when working up dental gold baths.

In the kit the oxidant quantities, particularly also when using $H_2O_2$ and KPMS, are selected or selectable in preferred manner on the basis of safety aspects for the user (particularly in dental technology). In particular, the $H_2O_2$ concentration and quantity are adjusted in such a way that the treated solution does not become too warm. Preferably no brown gold precipitate should appear directly following $H_2O_2$ addition in order to permit a better detection of the reaction sequence or end. Reference is made to the above remarks concerning the method of the invention ($H_2O_2$ as the starter, etc.).

The invention also covers the use of an oxidant for working up a gold sulphite bath, the oxidant being able to oxidize sulphite in a gold sulphite complex and reduce to its metallic form gold in a gold sulphite complex. Use is preferably made of two oxidants, particularly hydrogen peroxide and potassium-peroxo-monosulphate. Reference is expressly made in this connection to the preceding description.

The invention also relates to a worked up gold sulphite bath, a gold slurry and pure gold, which are obtainable according to the method of the invention. Here again express reference is made to the preceding description.

The advantages of the described parts of the invention are that with the inventive method it is possible to work up in simple manner all known galvanic, sulphite-based gold or gold alloy baths. It is merely necessary to add to the bath the suitable oxidant able to oxidize the sulphite in the complex and reduce the gold in the complex. A two-stage method with hydrogen peroxide and potassium-peroxo-monosulphate has proved particularly suitable. Thus, firstly hydrogen peroxide, particularly aqueous hydrogen peroxide solution can be added in order to start the reaction and precipitate most of the gold. Then potassium-peroxo-monosulphate can be added in order to reduce the remaining gold quantity in the complex and optionally detect and end of the reaction. The two oxidants can be made available in a suitable kit. It can be indicated on the kit for how many milliliters of gold bath the specific hydrogen peroxide and potassium-peroxo-monosulphate quantities are to be used. Corresponding quantities can also be made available in preproportioned form. For performing the method according to the invention it is consequently only necessary to provide a specific gold bath quantity, add oxidants, optionally stir and wait until the gold is precipitated in metallic form. The user of the method can exploit the gold precipitate either as gold slurry or as pure gold, e.g. can return it to a refiner.

EXAMPLES

In the subsequent examples working up takes place of gold sulphite baths or corresponding residual gold baths from the AGC(c) process or AGC(c) Speed process of the present applicant (galvanic dental technology) using the method of the invention.

The apparatus used for working up comprises a 1000 or 2000 ml measuring cup, a funnel with filter, a collecting vessel for filtrate and a stirring rod.

The invention given on the gold content of the gold sulphite solution or the residual gold baths relate to the gold content prior to performing the AGC(c) process, i.e. to an unused gold bath on the one hand and to the gold content after performing this process on the other.

Example 1

Composition:
800 ml gold sulphite solution (residual gold content approx. 14 g/l of an original solution with a gold content of approx. 50 g/l)
800 ml water
200 ml hydrogen peroxide $H_2O_2$ (7 wt. %)
20 g potassium-peroxo-monosulphate.
Performance:
800 ml of the residual gold solution to be worked up are provided and diluted 1:1 with 800 ml of water. This is followed by the addition of 200 ml of hydrogen peroxide $H_2O_2$ (7 wt. %) and stirring briefly takes place. The solution heats up to approximately 45°C. and an hour wait takes place. Then approximately 80% of the gold contained in the bath are precipitated. In the next stage 20 g of potassium-peroxo-monosulphate (KPMS) are added and brief stirring takes place. The solution turns brown as a result of the precipitated gold. The precipitated gold is filtered or decanted.

Example 2

Composition:
400 ml gold sulphite solution (residual gold content approx. 10 g/l of an original solution with a gold content of approx. 40 g/l)
40 ml water
80 ml $H_2O_2$ (7 wt. %)
80 g KPMS
Performance:
400 ml of the residual gold liquid to be worked up are placed in a 1 liter measuring cup and diluted 1:1 with 400 ml of water. Now 80 ml $H_2O_2$ (7 wt. %) are added and brief stirring occurs. The solution is heated to approximately 40°C. A one hour wait takes place and after this the temperature has dropped to 30°C. In the next stage 80 g of KPMS are added, followed by brief stirring and a temperature rise to 45°C. The solution turns brown as a result of the precipitated gold.

The solution is left to stand overnight, so that the gold precipitate is deposited on the bottom of the measuring cup. The precipitated gold is decanted or filtered, the precipitate is washed with water and left to dry in air. The gold precipitate can be melted, so that a golden yellow nugget is obtained.

Example 3

Composition:
1000 ml gold sulphite solution (residual gold content approx. 3 g/l of an original solution with a gold content of approx. 15 g/l)
500 ml water
100 ml $H_2O_2$ (7 wt. %)
125 g KPMS
Performance:
1000 ml of the residual gold liquid to be worked up are placed in a 2 liter measuring cup and diluted 2:1 with 500 ml of water. 100 ml $H_2O_2$ (7 wt. %) are now added and brief stirring occurs. The solution is heated to approximately 33°C. In the next stage 125 g KPMS are added, followed by brief stirring and a temperature rise to 49°C. The solution turns brown as a result of the precipitated gold.

The solution is left to stand overnight, so that the gold precipitate settles on the bottom of the measuring cup. The precipitated gold is decanted or filtered, the precipitate washed with water and left to dry in air. The gold precipitate can be melted, so that a golden yellow nugget is obtained.

Example 4

Composition:
400 ml gold sulphite solution according to example 2
400 ml water
80 ml $H_2O_2$ (7 wt. %)
80 g potassium peroxo disulphate (KPDS)
Performance:
400 ml of the residual gold liquid to be worked up are placed in a 1 liter measuring cup and diluted 1:1 with 400 ml water. Now 80 ml $H_2O_2$ (7 wt. %) are added, followed by brief stirring and accompanied by the heating of the solution. A one hour wait takes place, after which the temperature has dropped. In the next stage 80 g KPDS are added, followed by brief stirring and a rise in the temperature. The solution turns brown as a result of the precipitated gold.

The solution is left to stand overnight, so that the gold precipitate settles on the bottom of the measuring cup. The precipitated gold is decanted or filtered, the precipitate washed with water and left to dry in air. The gold precipitate can be melted, so that a golden yellow nugget is obtained.

Example 5

Composition:
400 ml gold sulphite solution according to example 2
400 ml water
350 g KPMS Performance:
400 ml of the residual gold liquid to be worked up are placed in a 1 liter measuring cup and diluted 1:1. with 400 ml water. 350 g KPMS are added, followed by brief stirring and accompanied by a temperature rise. The solution turns brown as a result of the precipitated gold. The solution is left to stand overnight, so that the gold precipitate is deposited on the bottom of the measuring cup. The precipitated gold is decanted or filtered, the precipitate washed with water and dried in air. The gold precipitate can be melted, so that a golden yellow nugget is obtained.

What is claimed is:

1. Method for working up a gold bath or gold alloy bath containing gold in the form of a gold sulfite complex, which comprises adding at least one oxidant, the oxidant oxidizes the sulfite contained in the complex and reduces the gold contained in the complex to its metallic form.

2. Method according to claim 1 wherein the oxidant is a solution of hydrogen peroxide, having a concentration of 3–15 percent by weight of hydrogen peroxide.

3. Method according to claim 1, wherein the oxidant is a compound liberating hydrogen peroxide.

4. Method according to claim 3, wherein the oxidant is a peroxo compound selected from the group consisting of peroxo disulfite, peroxo urea and potassium-peroxo-monosulfate.

5. Method according to claim 1, which comprises adding several oxidants.

6. Method according to claim 5, which comprises adding two oxidants.

7. Method according to claim 1, which comprises adding the oxidant portionwise.

8. Method according to claim 1, which comprises performing the method with at least two oxidants in at least two stages.

9. Method according to claim 8, which comprises adding firstly in a first stage at least one first oxidant and adding then in a second stage at least one second oxidant.

10. Method according to claim 9, which comprises adding hydrogen peroxide as the first oxidant.

11. Method according to claim 9, which comprises adding a peroxo compound as the second oxidant.

12. Method according to claim 1, which comprises diluting the gold bath with a solvent prior to oxidant addition.

13. Method according to claim 12, which comprises diluting the gold bath with water prior to oxidant addition.

14. Method according to claim 1, which comprises separating the gold in metallic form.

15. Method according to claim 14, which comprises thermally treating the gold after separating the gold.

* * * * *